(12) United States Patent
Baird-Smith et al.

(10) Patent No.: US 8,655,904 B2
(45) Date of Patent: Feb. 18, 2014

(54) METHOD AND SYSTEM TO ENHANCE DATA INTEGRITY IN A DATABASE

(75) Inventors: Anselm Baird-Smith, San Jose, CA (US); Daniel Silver, Los Altos, CA (US)

(73) Assignee: eBay, Inc., San Jose, CA (US)

( * ) Notice: Subject to any disclaimer, the term of this patent is extended or adjusted under 35 U.S.C. 154(b) by 1125 days.

(21) Appl. No.: 10/869,416

(22) Filed: Jun. 15, 2004

(65) Prior Publication Data

US 2005/0177582 A1 Aug. 11, 2005

Related U.S. Application Data

(60) Provisional application No. 60/543,991, filed on Feb. 11, 2004.

(51) Int. Cl.
*G06F 17/30* (2006.01)
(52) U.S. Cl.
USPC .......................................... 707/767; 715/257
(58) Field of Classification Search
USPC .................................. 715/517, 257; 707/767
See application file for complete search history.

(56) References Cited

U.S. PATENT DOCUMENTS

| | | | | | |
|---|---|---|---|---|---|
| 5,956,739 | A | * | 9/1999 | Golding et al. | 715/209 |
| 6,144,958 | A | * | 11/2000 | Ortega et al. | 707/999.005 |
| 6,349,295 | B1 | * | 2/2002 | Tedesco et al. | 707/3 |
| 6,647,383 | B1 | * | 11/2003 | August et al. | 707/3 |
| 6,785,671 | B1 | * | 8/2004 | Bailey et al. | 707/3 |
| 6,918,086 | B2 | * | 7/2005 | Rogson | 715/257 |
| 6,963,867 | B2 | * | 11/2005 | Ford et al. | 707/3 |
| 7,062,482 | B1 | * | 6/2006 | Madan et al. | 707/3 |
| 7,440,941 | B1 | * | 10/2008 | Borkovsky et al. | 715/257 |
| 7,676,462 | B2 | * | 3/2010 | Kirkland et al. | 707/999.005 |
| 2003/0195877 | A1 | * | 10/2003 | Ford et al. | 707/3 |
| 2004/0078457 | A1 | * | 4/2004 | Tindal | 709/223 |
| 2004/0261021 | A1 | * | 12/2004 | Mittal et al. | 715/517 |

OTHER PUBLICATIONS

EBay.com, "Smart Search EBay", Jan. 6, 2001, www.archive.org☐☐<http://web.archive.org/web/20010130114100/pages.ebay.com/search/items/search.html>.*
drugstore.com, "Start Page", Feb. 3, 1999, www.archive.org☐☐<http://web.archive.org/web/20000823223050/www.drugstore.com/index.html>.*
IEEE, The Authoritative Dictionary of IEEE Standards Terms, 2000, IEEE Press, 7th Ed., p. 272.*
Merriam-Webster, Site-Map, Jan. 23, 2002, m-w.com☐☐<http://web.archive.org/web/20020125102102/www.m-w.com/map_new.htm>.*

(Continued)

*Primary Examiner* — Khanh Pham
(74) *Attorney, Agent, or Firm* — Schwegman, Lundberg & Woessner, P.A.

(57) ABSTRACT

A system and method are provided to process listing data in a network-based commerce system, for example, a network-based auction facility. The method may comprise providing a user with a graphic user interface to enter listing data in the network-based commerce system, the listing data including at least one entered word. A database including a plurality of reference words that relate to listings provided by the network-based commerce system may then be investigated. If at least one entered word is misspelled, the method may include identifying at least one suggested word from the plurality of reference words and communicating the at least one suggested word to the user. In one embodiment, the reference words include words frequently misspelled and the at least one suggested word is the correct spelling of the word. The at least one suggested word may be associated with at least one category associated with a listing.

14 Claims, 13 Drawing Sheets

(56) References Cited

OTHER PUBLICATIONS

Elmi, Mohammad A., "A Natural Language Parser With Interleaved Spelling Correction Supporting Lexical Functional Grammar and Ill-Formed Input," *Graduate School of the Illinois Institute of Technology*, Chicago, Illinois, (Dec. 1994).

Elmi, Mohammad A., et al., "Spelling Correction Using Context," *Department of Computer Science*, Illinois Institute of Technology, (Aug. 10, 1998).

\* cited by examiner

LOST YOUR INFORMATION? CLICK REFRESH. LEARN HOW TO STOP INFORMATION LOSS  ⟵ 400

SELL YOUR ITEM: DESCRIBE YOUR ITEM

| 1. CATEGORY | 2. TITLE AND DESCRIPTION | 3. PICTURES AND DETAILS | 4. PAYMENT AND SHIPPING | 5. REVIEW AND SUBMIT |

ITEM TITLE  * = REQUIRED
ITEM TITLE*   ⟵402   LEARN HOW TO WRITE A GOOD ITEM TITLE

[ CADDYSHACK ]

NO HTML ASTERISKS, OR QUOTES. 45 CHARACTERS MAXIMUM.

ITEM SPECIFIC: MOVIES NEW!

MOVIE TITLE:   CADDYSHACK        CHANGE MOVIE    VERIFY THIS ITEM: PLEASE MAKE
LEADING ROLE:  CHEVY CHASE                       SURE THE ITEM YOU ARE LISTING
FORMAT:        DVD                               MATCHES THE INFORMATION ON THE
UPC CODE       085391-72152-9                    LEFT. IF IT DOES NOT, TRY AGAIN
RELEASE YEAR:  2000
LENGTH         99 MINUTES
                                                 IF YOU SEE ANY ERRORS WE WOULD
GAME                                             APPRECIATE IT IF YOU WOULD SEND
[ *      ▽ ]                                     US FEEDBACK.

RATING
[ *      ▽ ]

CONDITION
[ *      ▽ ]

STOCK PHOTO
   ☑ INCLUDE STOCK PHOTO                CHOOSE TO ADD ADDITIONAL MOVIE
   ☑ INCLUDE PRE-WRITTEN ITEM           INFORMATION TO YOUR LISTING. YOU
     SUMMARY (E.G., MOVIE DESCRIPTION)  MAY ALSO

* YOU MAY ALSO ADD YOUR OWN PICTURE ON THE NEXT PAGE     SPELL CHECK LINK/
                                                         BUTTON GRAPHIC
DESCRIPTION

◇  NEED HELP WITH HTML?                               SPELL CHECK HELP
  ◦  USE OUR NEW HTML DESCRIPTION BUILDER FOR FREE  *= REQUIRED  ALIGNED WITH FEATURE

DESCRIPTION *              ≡☑  SPELL CHECK —454 LEARN MORE ABOUT SPELL CHECK.
ENTER ANY UNIQUE INFORMATION USING PLAIN TEXT OR HTML   IF YOU ENTER PLAIN TEXT
                                                        ONLY, YOUR DESCRIPTION
[                                              ▽ ]      MAY NOT BE FORMATTED.
[                                              ▽ ]—404  BUT YOU CAN USE HTML
                                                        TO ADD IMAGES AND
PREVIEW DESCRIPTION                                     FORMAT YOUR TEXT.
NOTE: IF YOU ARE A FIRST SELLER, YOU MAY BE ASKED TO DOWNLOAD A    HTML TIP: ENTER <p> TO
SMALL FILE ON THE NEXT PAGE. THIS FILE WILL HELP YOU ADD PICTURES  START A NEW PARAGRAPH

[ < BACK ]                    [ CONTINUE> ]

LOST YOUR INFORMATION? CLICK REFRESH. LEARN HOW TO STOP INFORMATION LOSS.

SELL YOUR ITEM: SPELL CHECK TITLE AND DESCRIPTION

○ LIVE HELP

| 1. CATEGORY | 2. TITLE AND DESCRIPTION | 3. PICTURES AND DETAILS | 4. PAYMENT AND SHIPPING | 5. REVIEW AND SUBMIT |

TITLE: EARLY 1900s PHOTO POSTCARD, FAIR OR CARNIVAL

DESCRIPTION:
THIS OLD POSTCARD IS IN EXCELLENT CONDITION. THERE IS MINOR CORNER WEAR AND THE BACK SEEMS TO HAVE BROWNED A LITTLE, OTHERWISE STILL VERY NICE. NOT YET USED IN THE MAIL. DEFINITELY A GREAT COLLECTIBLE, SHOWS FERRIS WHEEL AND BOOTHS, SIGNED BY RUDOLPH ASTOS, THE PHOTOGRAPHER. THIS POSTCARD WOULD LOOK SPECTACULAR FRAMED, MATTED OR DISPLAYED!

PREVIEW YOUR DESCRIPTION

☑ SPELL CHECK COMPLETED, ALL WORDS CHECKED

SPELL CHECKER COMPLETE

NAVIGATION

<SAVE AND RETURN — 418
SAVE YOUR CHANGES AND RETURN TO DESCRIBING YOUR ITEM

SAVE AND CONTINUE> — 420
CONTINUE LISTING YOUR ITEM

CANCEL CHANGES
DISCARD YOUR SPELLING CHANGES AND RETURN TO DESCRIBING YOUR ITEM

METHOD AND SYSTEM TO ENHANCE DATA INTEGRITY IN A DATABASE

CLAIM OF PRIORITY

This application claims the priority benefits of U.S. Provisional Application No. 60/543,991, filed Feb. 11, 2004, which is incorporated herein by reference.

FIELD OF THE INVENTION

The present invention relates generally to the technical field of data processing and, in one exemplary embodiment, to a method, system and machine-readable medium to enhance data integrity.

BACKGROUND OF THE INVENTION

More and more Internet users are realizing the ease and convenience of buying and selling online via a network-based commerce system. Certain such commerce systems are focused on person-to-person trading, and collectors, hobbyists, small dealers, unique listing seekers, bargain hunters, and other consumers, are able to buy and sell millions of listings at various online shopping sites. Such systems also support business-to-person and business-to-business commerce.

The success of a networked-based commerce system may depend upon its ability to provide a user-friendly environment in which buyers and sellers can conduct business efficiently. Current network-based commerce systems have certain limitations in the manner in which they present information to users.

It will however be appreciated that the invention is not limited to application to a network-based commerce system but that it may be applied in any data processing environment.

DETAILED DESCRIPTION OF THE DRAWINGS

The invention is now described, by way of example, with reference to the accompanying diagrammatic drawings in which the same reference numerals indicate the same or similar features, unless otherwise indicated.

FIG. 5 is an exemplary embodiment of a network-based commerce system user interface, also in accordance with the invention.

FIG. 7 is network-based spell checker user interface, also in accordance with the invention, illustrating an example of completing a spell checking function.

FIG. 8 is a user interface advising unavailability of the spell check function on the system.

DETAILED DESCRIPTION

A method and system to spell check commerce-related listing information are described. In the following description, for purposes of explanation, numerous specific details are set forth in order to provide a thorough understanding of the present invention. It will be evident, however, to one skilled in the art that the present invention may be practiced without these specific details.

Platform Architecture

Figure 1:
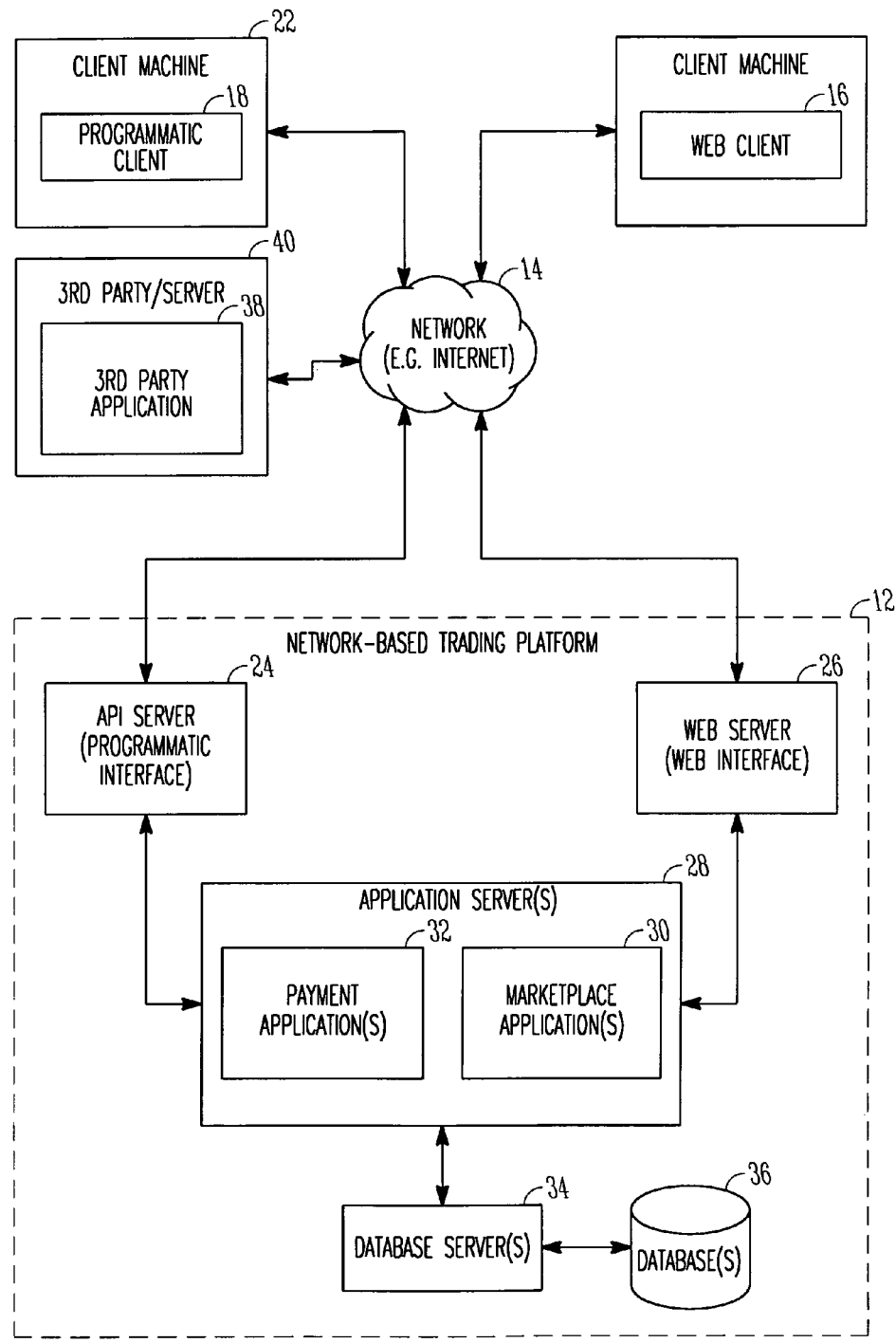
FIG. 1 is a network diagram illustrating an exemplary network-based commerce system, according to an exemplary embodiment of the invention.

FIG. 1 is a network diagram depicting a system 10, according to one exemplary embodiment of the present invention, having a client-server architecture. A commerce platform, in the exemplary form of a network-based marketplace 12, provides server-side functionality, via a network 14 (e.g., the Internet) to one or more clients. FIG. 1 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more database servers 34 that facilitate access to one or more databases 36.

The marketplace applications 30 provide a number of marketplace functions and services to users that access the marketplace 12. The payment applications 32 likewise provide a number of payment services and functions to users. The payment applications 30 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments of the present invention, the payment applications 32 may form part of a payment service that is separate and distinct from the marketplace 12.

Further, while the system 10 shown in FIG. 1 employs a client-server architecture, the present invention is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace application(s) 30 and payment application(s) 32 via the web interface supported by the web server 26. Similarly, the programmatic client 18 accesses the various services and functions provided by the marketplace application(s) 30 and payment application(s) 32 via the programmatic interface provided by the API server 24. The programmatic client 18 may, for example, be a seller application (e.g., the TURBOLISTER application developed by eBay, Inc., of San Jose, Calif.) to enable sellers to author and manage listings on the marketplace 12 in an off-line manner, and to perform batch-mode communications between the programmatic client 18 and the network-based marketplace 12.

FIG. 1 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Marketplace Applications

Figure 2:
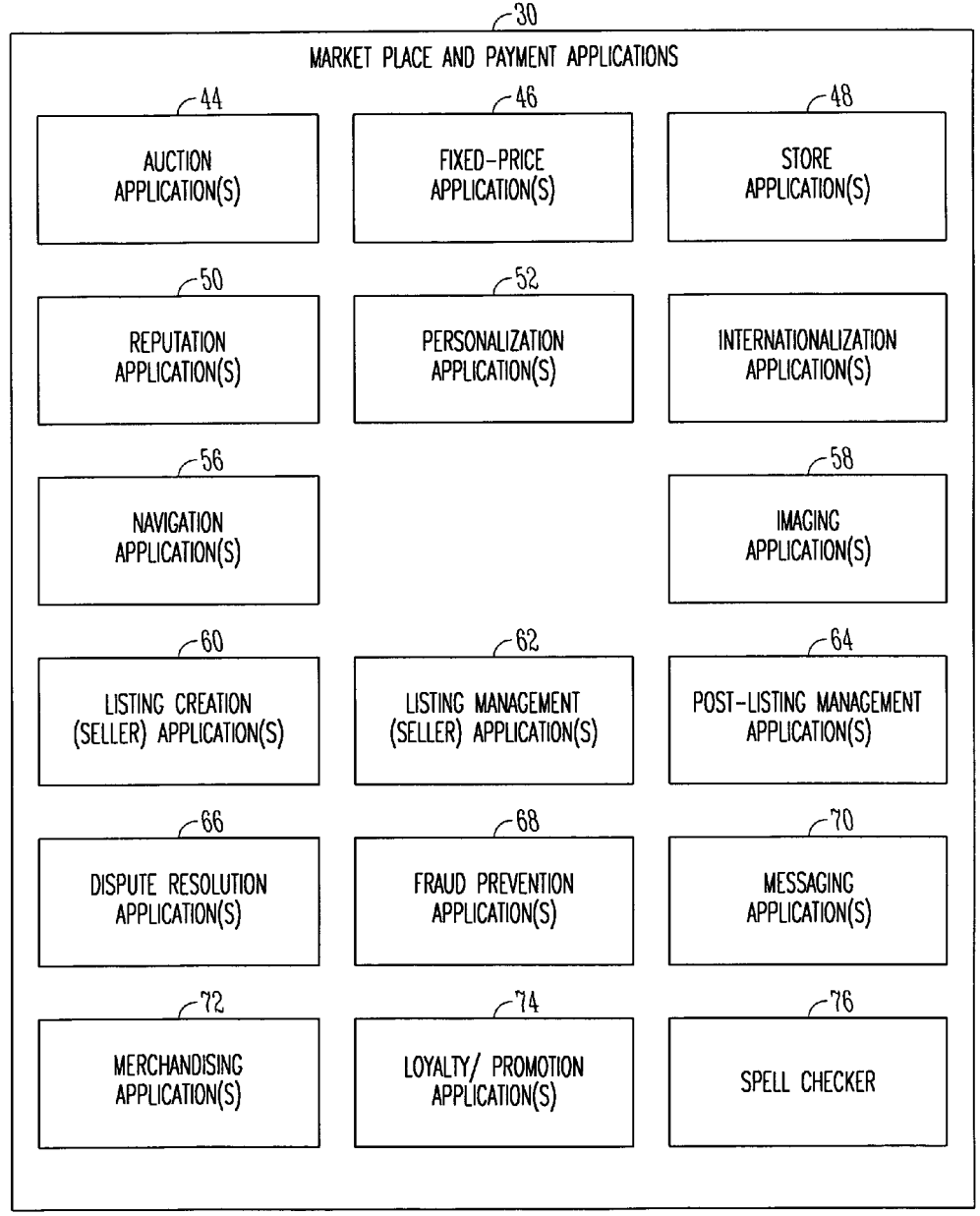
FIG. 2 is a block diagram illustrating multiple marketplace and payment applications, according to an exemplary embodiment of the present invention.

FIG. 2 is a block diagram illustrating multiple marketplace and payment applications 30 that, in one exemplary embodiment of the present invention, are provided as part of the network-based marketplace 12. The marketplace 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the BUY-IT-NOW (BIN)) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network based-marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the marketplace 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

It is to be appreciated that various different embodiments of the network-based trading platform or marketplace 12 may include any one or more of the exemplary marketplace applications 44-74. It will also be appreciated that functionality provided by any two or more marketplace applications may be combined into a single application.

Data Structures

Figure 3:
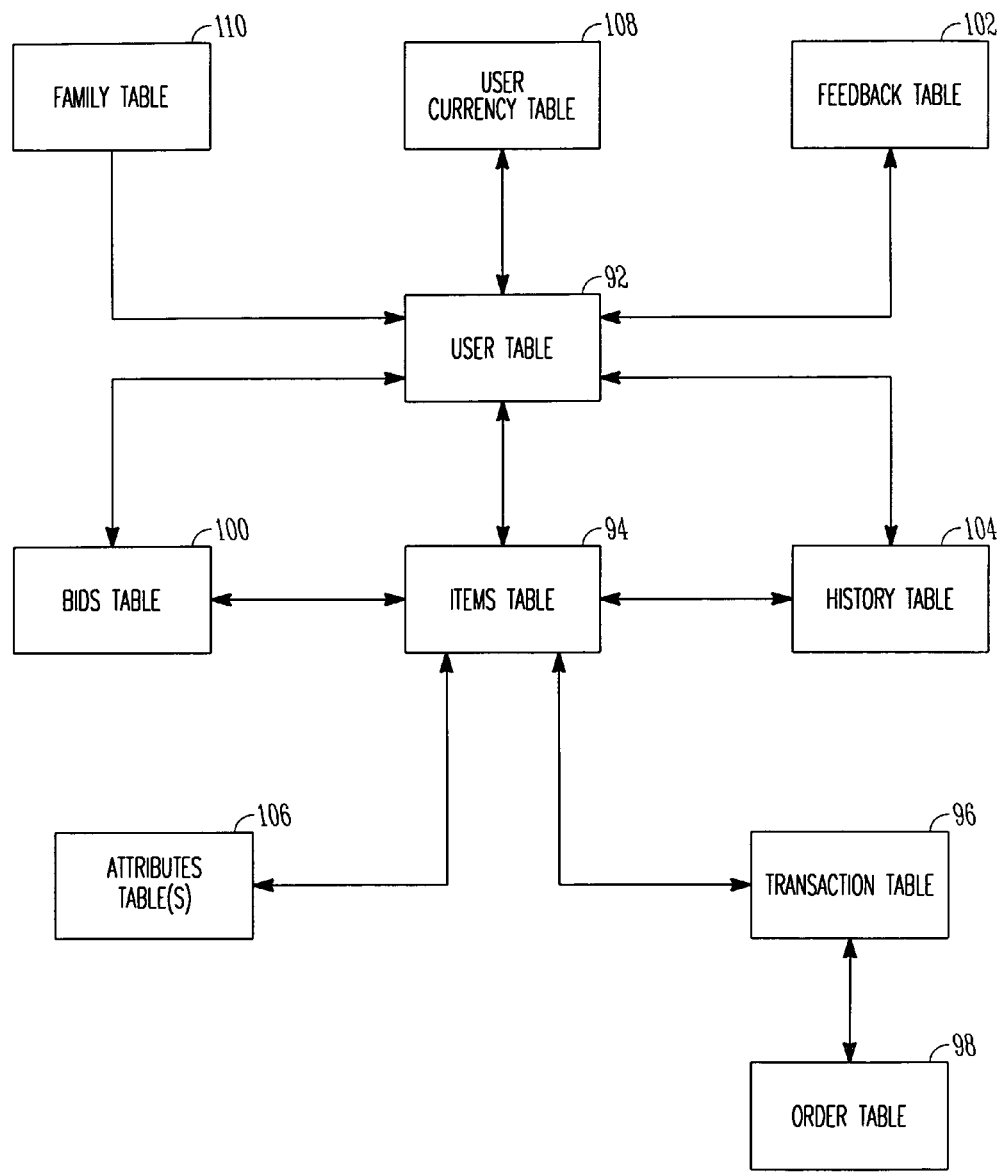
FIG. 3 is a high-level entity-relationship diagram illustrating exemplary tables that may be utilized by, and support, marketplace and payment applications.

FIG. 3 is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifier, address and financial instrument information pertaining to each such registered user. A user may, it will be appreciated, operate as a seller, a buyer, or both, within the network-based marketplace 12. In one exemplary embodiment of the present invention, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records for goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based marketplace 12 in connection with an auction-format listing supported by an auction application 44. A feedback table 102 is utilized by one or more reputation applications 50, in one exemplary embodiment, to construct and maintain reputation information concerning users. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

Figure 4:
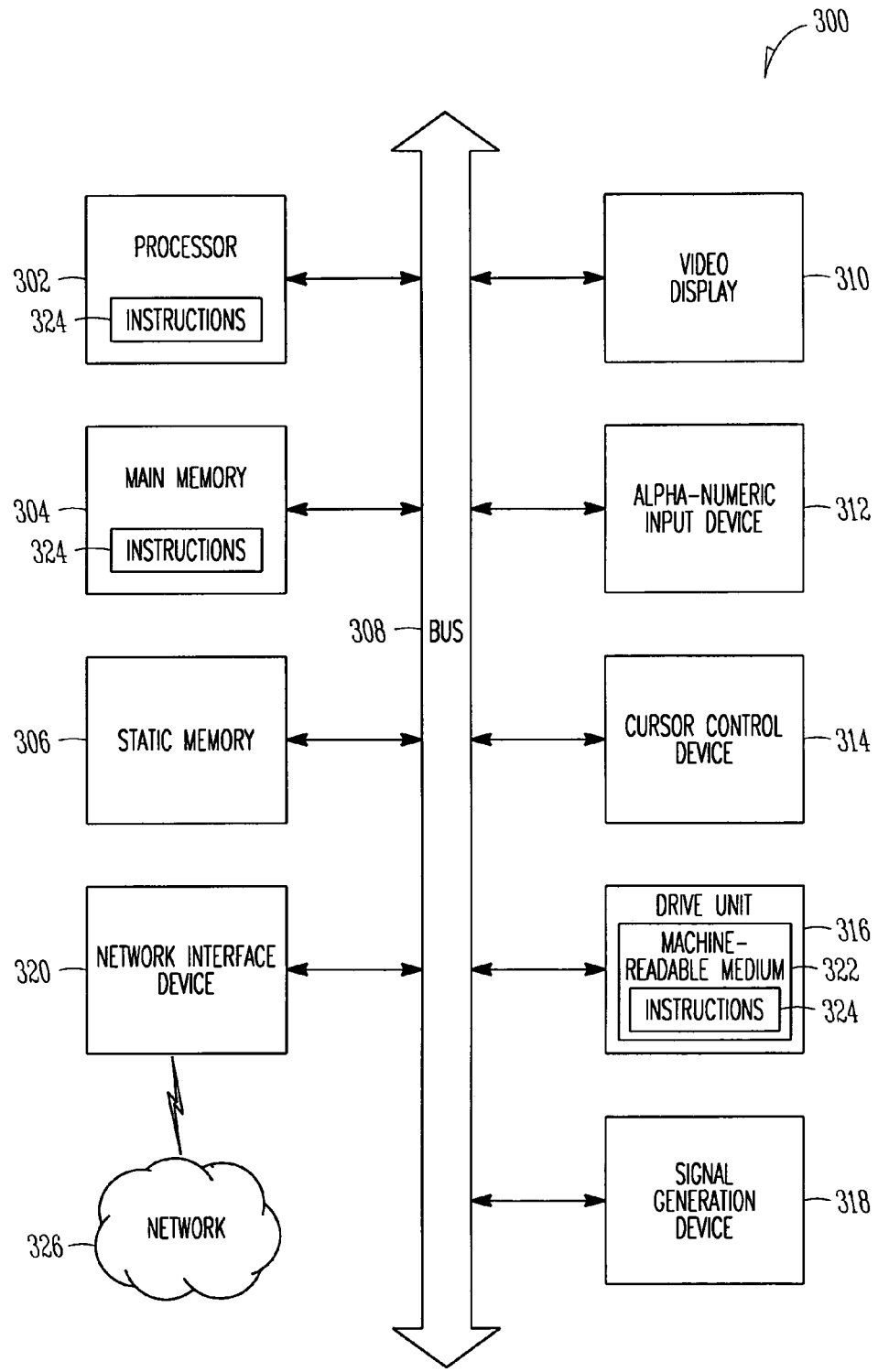
FIG. 4 is a diagrammatic representation of an exemplary machine within which a set of instructions for causing the machine to perform any one or more of the methodologies discussed herein may be executed.

FIG. 4 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" may be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

Network-Based Marketplace Spell Checker

One embodiment of the invention relates to a data transaction processor for spell checking commerce-related listing information. To this end, an exemplary network-based marketplace spell checker 76 (including a query component to investigate a reference database of reference words/terms) may be provided as one of the marketplace applications 30

(see FIG. 2). It will however be appreciated that the spell checker 76 may be provided anywhere in the system 10. The spell checker 76 may comprise a database of words based on searches done in the network-based marketplace 12, such as network-based marketplace search logs or the like. A list of words may be stored in a table and be listed in order of most commonly searched words to least commonly searched words. This list may include search terms that may be considered network-based marketplace lingo (e.g. star wars) as well as commonly or frequently searched misspellings, (e.g., Camero instead of Camaro) in respect of a search for a particular motor vehicle. Thus, a database may be provided that list words, terms or the like that relate to a specific topic.

In one embodiment, if a search term entered by a user meets a certain threshold, then a suggested alternative search term may be returned. As such, the network-based marketplace spell checker 76 may be more than a dictionary and may contain more words than those found in a 'regular' dictionary or spell checker e.g., an English dictionary, a French dictionary or the like. The spell checker 76 may recognize and suggest popular search terms used in the network-based marketplace 12. In one embodiment, the spell checker 76 recognizes popular misspellings of search terms and may suggest an alternate or correct spelling of the search term. Accordingly, if the spell checker 76 is used to spell check terms or words entered in a database, errors in terms or words may be corrected thereby enhancing the integrity of data in the database.

In another embodiment, the words stored in the database (e.g., the database 36) include both words provided by dictionary vendor and popular search terms (e.g., terms frequently used by users when searching or listing an item) in the network-based marketplace 12. It will be appreciated that the particular popular or frequently searched terms may differ dependent on the particular embodiment, or application of the invention. Thus, the spell checker 76 may be customized for a particular application e.g. a particular marketplace. The present invention may make seller's listings more accessible to users by ensuring that unintentional mistakes (e.g., when listings are entered by a user) are corrected. As the integrity of the data entered is enhanced, a user's searching experience may also be enhanced by returning more items that would have been previously invisible to the user had the mistakes not been corrected when the data was entered.

FIG. 5 is a diagram illustrating an exemplary user interface of the network-based marketplace spell checker, according to an embodiment of the present invention. As described in more detail below, clicking or activating a spell checker link or icon will propel the user to the spell check page.

Figure 6:
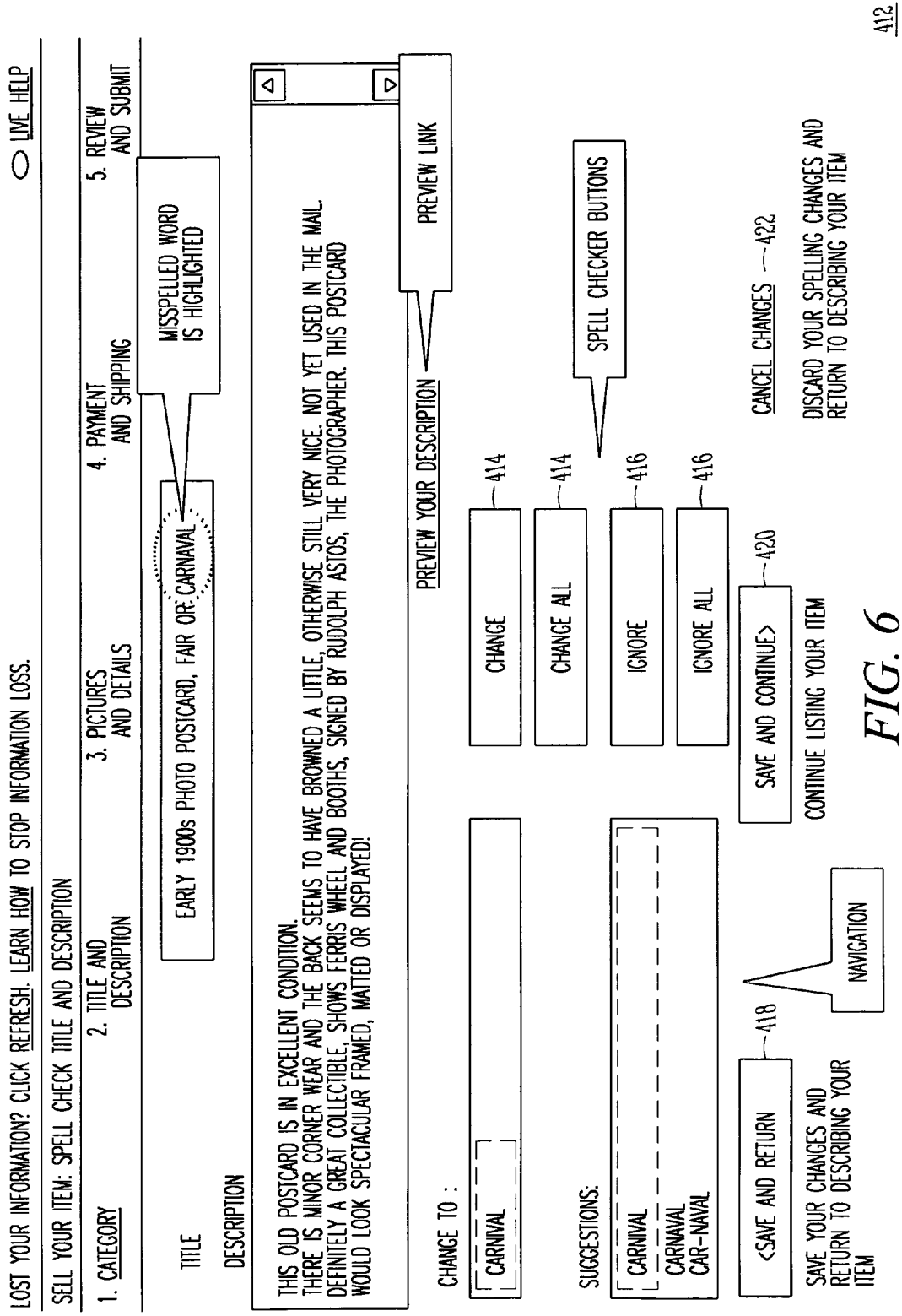
FIG. 6 is an exemplary embodiment of a network-based marketplace spell checker also in accordance with the invention.

In one embodiment, the user interface is in the form of a spell check page 400 that may be a primary page where spell-checking information relating to merchandise and a transaction is conducted. For example, a spell check may be performed by the marketplace 12 on a title 402, a description 404 of the merchandise, and terms of sales entered by a user. It will however be appreciated that the spell check may be performed on any topic specific data entered by a user. The spell check page 400 may, for example, automatically emphasize the first misspelled word entered by the user. If there are no misspelled words, a "spell check complete" message may be provided as shown in user interface 410 (see FIG. 7). The network-based spell checker 76 may provide a list of suggested words to the user as shown in user interface 412 (see FIG. 6). The may user then select one of the suggested words provided by the spell checker 76 and change the misspelled word (e.g., "carnaval") or all instances of the word by activation of one of the appropriate spell check buttons 414. Likewise the user may ignore a suggested change by activation of one of the appropriate spell check buttons 416. In addition, the user can provide or enter another word instead of selecting from the list of suggested words. In one embodiment, when the spell checker 76 provides no suggestions to a misspelled word, the misspelled word may be highlighted. As mentioned above, the spell checker 76 may allow a user to replace the misspelled word with the suggested word for a single instance or for all instances. Similarly, the user can choose to ignore one or all occurrences of a misspelled word, as discussed above. Although the given example is a common dictionary word ("carnival"), misspelled words relating to a specific topic (e.g., motor vehicles where Camero may be entered instead of Camaro). As mentioned above the dictionary may be customized to a specific database application or marketplace.

The user may choose to save all changes made during a spell check operation and return to a previous page by activating a "save and return" button 418, or save changes and continue with a next step in a listing process by activation of "save and continue" button 420. In one embodiment, the user can also opt to cancel any changes made and return to a previous page by activating or clicking on a link 422. It will be appreciated that in different embodiments other links and buttons may be provided. The spell checker 76 may inform the user when the function is completed, as illustrated in FIG. 7.

Figure 8:
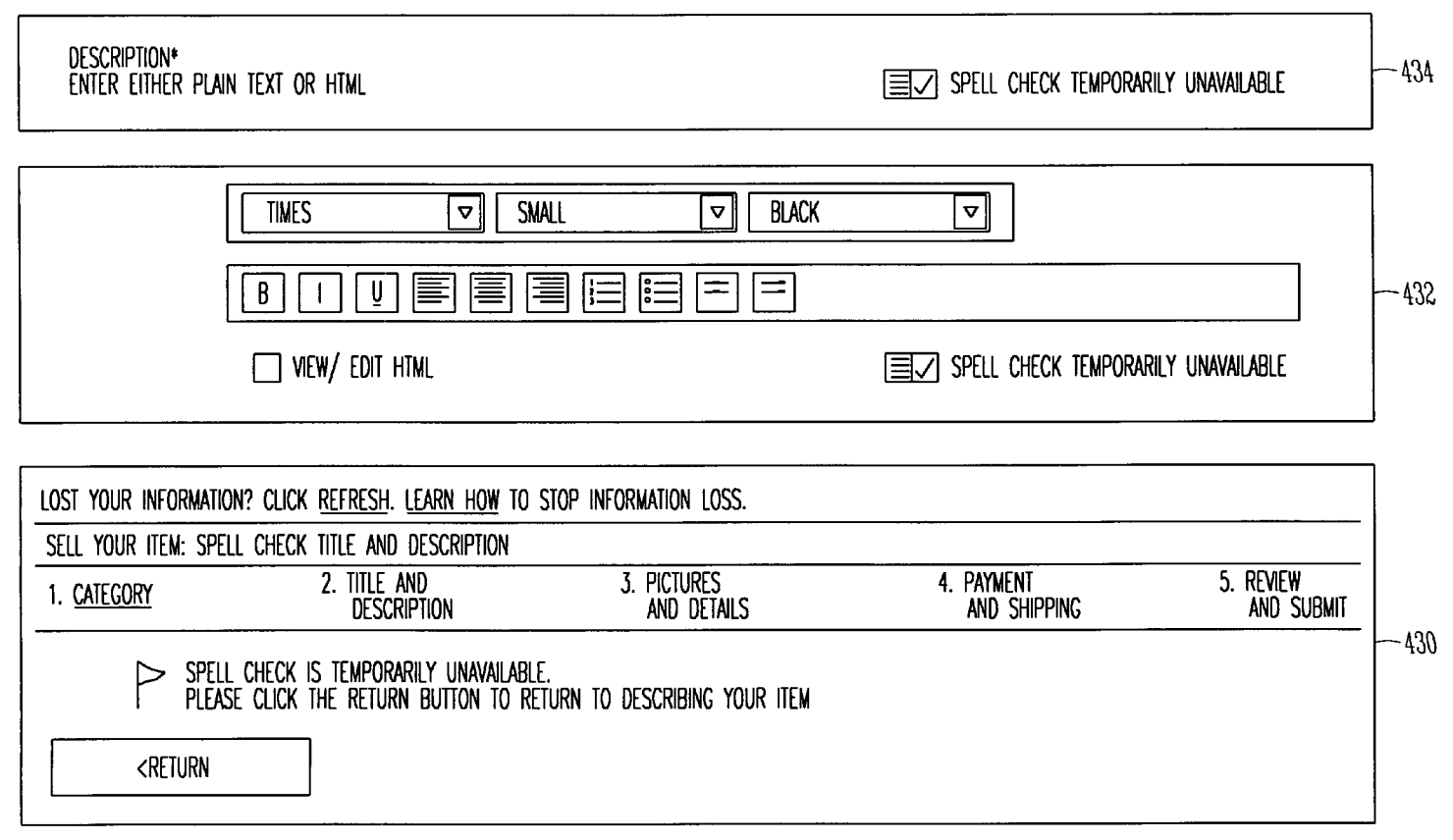

The network-based marketplace spell checker 76 may also be configured or designed for fault tolerance. For example, the user may be informed if the spell check functionality is unavailable at different data entry points (e.g., different listing steps), as illustrated by the exemplary user interfaces 430, 432, and 434 in FIG. 8.

Figure 9:
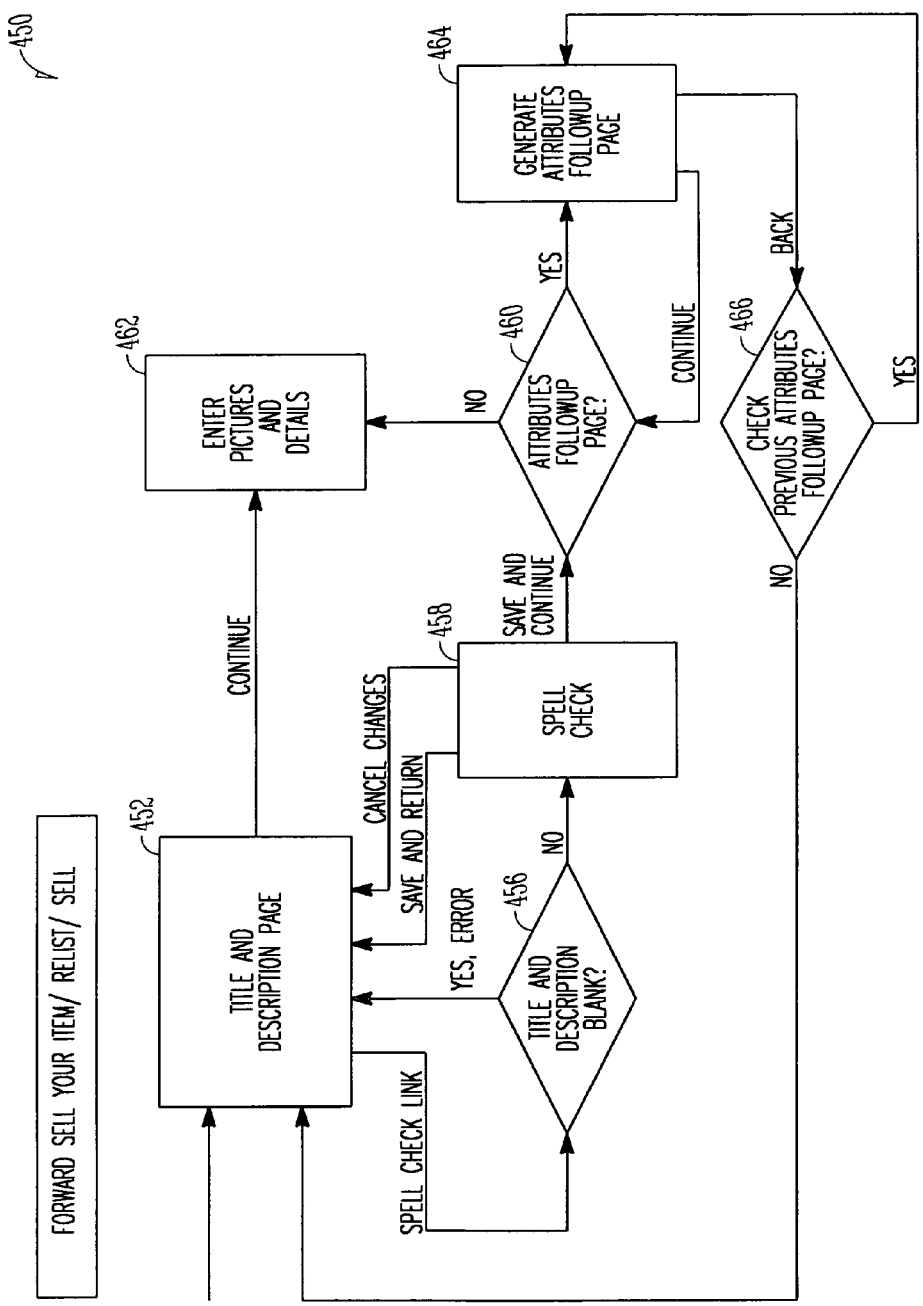
FIG. 9-11 are flow diagrams illustrating exemplary operations of the spell checker in various exemplary applications.
Figure 10:
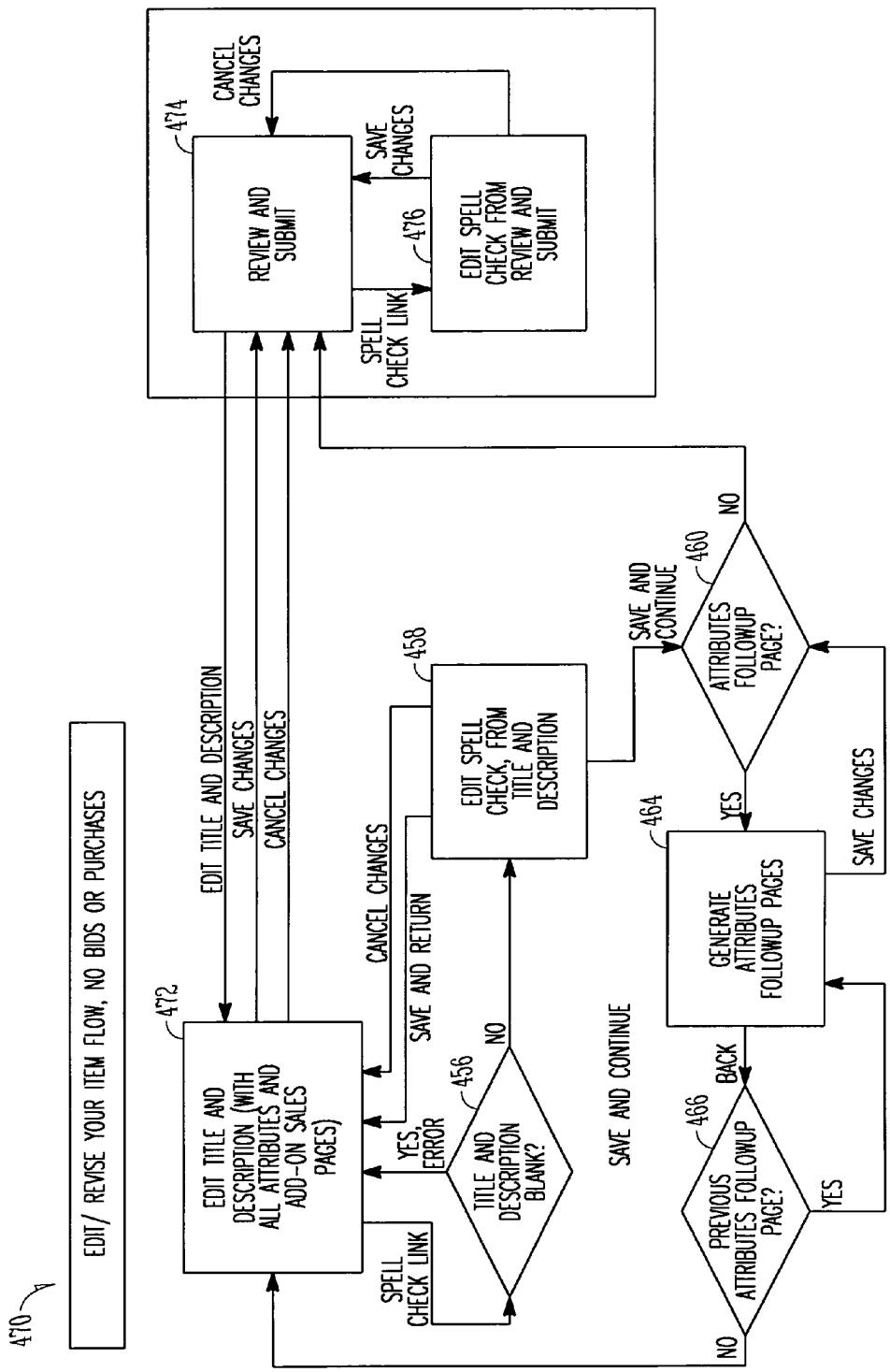

FIGS. 9-10 are exemplary flow diagrams illustrating exemplary applications of the spell checker in a network-based commerce environment where items are listed in a marketplace. In one embodiment, the exemplary applications are included in the system 10 of FIG. 1.

Referring in particular to FIG. 9, reference 450 generally indicates an exemplary method, in accordance with the invention, to forward sell an item, relist an item or sell item (enter or change a listing). As shown at operation 452, the method 450 may generate a title and description page which is then presented to a user via a user interface (e.g. the user interface 400 shown in FIG. 5). For example, the user interface 400 may be generated at the web server 26 (providing an exemplary user interface component) and presented to the user at the client machine 22 (see FIG. 1). The user may then proceed to enter relevant data in the various fields provided by the user interface 400 and, if the user wishes to conduct a spell check on the information entered, he or she may then activate a spell check button or link (e.g. the spell check link 454—see FIG. 5). In the exemplary embodiment, the method 450 at decision operation 456 checks to see whether or not the title and description field has been left blank and thus not completed by the user. If so, an error may be returned to the user and the method 450 may revert to operation 452. If, however, the title and description fields are not left blank, then the method 450 may proceed to operation 458 where a spell check is carried out on the words or terms that have been entered by the user. As previously discussed, the user may be provided with an option to cancel changes and/or save changes made during the spell check functionality and return to the user interface 400. The user may also be provided with a save and continue option (see for example the "save and continue" button 420 of FIG. 6) which allows the user to save changes made by the spell checker and, thereafter, to continue with the data entry (e.g., entering attributes associated with a listing). In this event, the method 450 proceeds to decision operation 460 which identifies whether or not an attributes follow-up page is required. If an attributes follow-up page is not required, then the method 450 proceeds to operation 462 to provide the user with an option to enter pictures and/or further details associated with a listing. It will be noted, that if the user does not wish to conduct a spell check, then the method 450 may proceed directly from operation 452 to operation 462 where some pictures and more details are entered.

Returning to decision operation 460, if an attributes follow-up page is required, then the method 450 proceeds to operation 464 where an attributes follow-up page is generated and generated (e.g., at the web server 26) and presented to the user via a graphic user interface (e.g., via the client machine 22). If the user activates a back button provided on the attributed follow-up page, the method 452 may proceed to decision operation 466 and, if a previous attributes follow-up page is required, the method 450 may then return to operation 464. Otherwise, the method 450 may proceed to operation 452 where the title and description page (with misspellings corrected) is presented to the user. In one embodiment, if a continue button is selected at operation 464, the method 450 returns to decision operation 460. Thus, in one embodiment of the invention, the spell checker 76 may be used when a user enters data or information in order to sell an item, relist an item, and/or sell a similar item. As misspellings of terms relating to a specific topic or application are checked at an entry stage, terms stored in the database may be more accurate thus enhancing the integrity of the data stored therein. Likewise, searching of the database may be enhanced.

Referring in particular to FIG. 10, reference numeral 470 generally indicates an exemplary method, in accordance with the invention, to edit and revise a listing (e.g., an item listed) on the exemplary marketplace 12. In one embodiment of the invention in which the network-based marketplace 12 is a network-based auction facility, the method 470 may only be performed when no bids or purchases are associated with a particular listing.

As shown at operation 472, the method 470 may generate an edit, title and description graphic user interface or web page to allow a user to edit and/or revise a listing. The edit, title and description graphic user interface or web page may, for example, resemble the graphic user interface 400 of FIG. 5 and may, for example, be generated by the web server 26 and presented to the user via the client machine 22. In the exemplary embodiment provided, the method 470 includes similar functionality to the method 450. In particular, the method 470 includes a check to see if the title and description has been left blank (see operation 456), a spell check operation 458, attributes follow-up page operations 460 and 464, and a previous attributes follow-up page operation 466. In addition, the method 470 includes a review and submit operation 474 which generates and renders a web page or graphic user interface to the user so as to enable the user to review changes and edits that have been made and submit them for presentation in the marketplace 12. The review and submit operation 474 also allows a user to select further spell check functionality as shown at operation 476.

Figure 11:
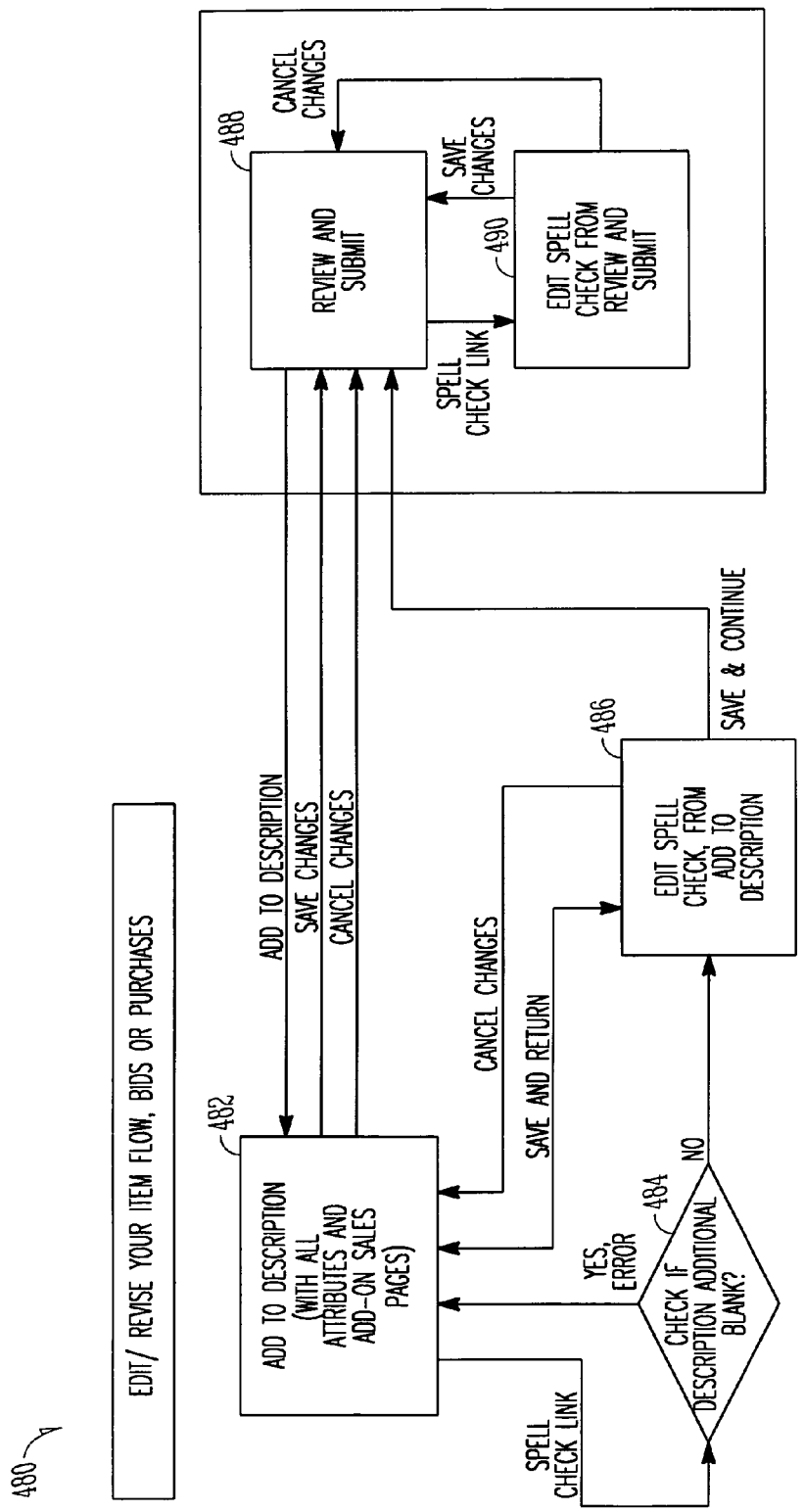

Referring in particular to FIG. 11, reference 480 generally indicates a method, in accordance with the invention, to edit or revise listing (e.g. an item) when there are existing bids or purchases relating to the listing. As shown at operation 482, the method 480 may generate and render a web page or graphic user interface to the user to enable the user to add to the description of a particular listing. In a similar fashion as described above, if a user then activates a spell check link, the method 480 proceeds to a check if the description field has been left blank (see operation 484 which determines whether or not the description field has been left blank). If so, an error is returned to the user and the method 480 returns to operation 482. If not, an edit spell check operation 486 is activated to check the spelling of terms and/or words included or added to the description. Dependent upon the particular buttons then activated by the user, the method 480 either returns to operation 482 or proceeds to operation 488. Operation 488 is also associated with operation 490 which respectively correspond to operations 474 and 476 in the method 470 of FIG. 10.

In another embodiment, the exemplary network-based marketplace spell checker 76 is configured or designed to exclude censored words (e.g., profane language or the like). Thus, the spell checker 76 may not correct any word that matches a word on a censored words list in the database. Therefore, in one embodiment, a word that exists on the censored words list may not be taken as an input nor returned as output by the spell checker 76. The list or words used in the spell checker 76 may be provided by a third party or a marketplace operator.

Architecture of Network-Based marketplace Spell Checker

Figure 12:
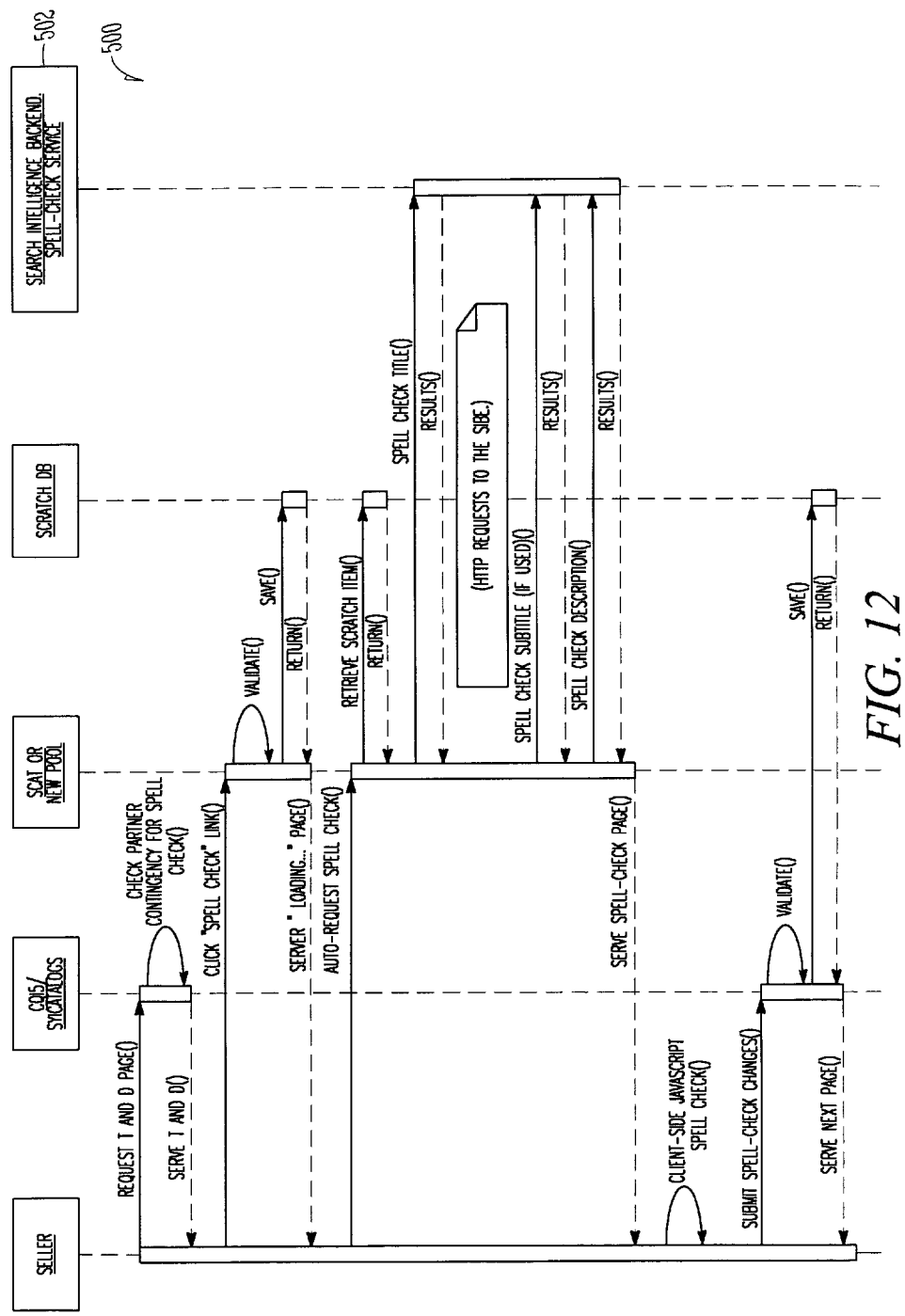
FIG. 12 is a sequence diagram of an exemplary spell check process, also in accordance with the invention.

In one embodiment, the network-based marketplace spell checker 76 may use JavaScript on the front end, and comprise a search intelligence module and a spell check service adaptor. An exemplary embodiment of the spell check process or methodology is shown, by way of example in a sequence diagram 500 (see FIG. 12).

Search Intelligence Module

In an exemplary embodiment of the present invention, the spell checker may be provided in a search intelligence module 502 that provides various linguistic services to enhance the market-place search functionality. For example, the module 502 may run on an HTTP server (e.g., the web server 26, the application server(s) 28, or the like), which acts as a container for the various services it offers. Each service may be backed up by precompiled data structure provided, for example, on the database(s) 36.

In one exemplary embodiment, the search intelligence module 502 performs a spell check on titles (e.g., of listings) entered by a user, and a spell check of descriptions associated with the titles. Thus, a user may selectively conduct a spell check on one, or both, of a title of a listing and a description associated with a listing, thus providing two different services which the user may select (e.g., by way of a link on the user interface 412—see FIG. 6).

In one embodiment, the spell check performed by the search intelligence module 502 may be contextual in that it spell checks listing or item titles against frequently used query terms, while the listing or item descriptions may be spell checked against frequently used description terms. It will thus be appreciated that the reference words or terms used to spell check various parts of a listing may differ (e.g., a dictionary of reference words or terms for titles, a dictionary of reference words or terms for descriptions, and son on). When the reference words or terms against which titles are checked are query terms, it will be noted that the number of times items that are matched may be substantially increased.

The search intelligence module 502 may include a spellchecker engine including a set of rules that permits customization of spell checking based on the nature of the terms or user entered data. For example, an email address may be recognized and not spell checked. Likewise, model numbers for listings (e.g., a model number of a particular product) may be identified and not spell checked. Thus, in one exemplary embodiment, the search intelligence module 502 may identify the type or nature of listing data entered by a user, selectively spell check certain types of listing data, and ignore other types of listing data. Thus, listing data entered may be excluded from any investigation of the database including the plurality of reference words. In one exemplary embodiment, a rule may be provided to define exceptions and to provide a selected or preferred default terms or words. For example, certain terms or words entered by a user may be identified and the search intelligence module 502 may produce a known set of suggestions in response to the user entered term or word (e.g., irrespective of any output from the spellchecker engine).

One exemplary service provided by the intelligent search module 502 is to provide hints to refine a search query. Given a query, a category and a site, the service may make one or more suggestions including:

A Category to run the query in,

A rewritten query, which may either be a spell-checked version of the original query, an empty string (e.g., an indication that the suggestion is to browse the category) or the original query without the words that are used to indicate the category.

An estimated number of items that the suggested query should return,

A count of the typos (typographical errors) that were fixed or corrected.

In addition to returning a set of suggestions, the service may also return one or more of the following information that pertains to an entire set of suggestions made:

The CPU time it took to compute the suggestion,

The quality of the suggestion as a real number between 0 and 1,

The number of suggestions computed, and

The estimated number of items the original query would have yielded.

The following provides exemplary protocol between a client and a search intelligence module for various exemplary queries. For example, if a user typed in "jame bond" on one of the user interfaces of the marketplace 12, the search intelligence module 502 may be invoked by making a HTTP call to the following URL:

http://atg-dev2:8012/ris?Qy=jame+bond&Nr=4&Si=0 wherein the Qy parameter contains the text of the query, Si indicates that the query is to be run in Site 0, (e.g., when the marketplace 12 has multiple sites) and that the number of desired suggestions Nr to be generated by the spell checker is, for example, at most 4. The response to this query may be a plain text document encoded in UTF-8:

```
Tq: 10
Q: 0.4909
Nd: 4470
Nr: 4
RIS    196      756     1      "james bond"    \
       + Entertainment |Entertainment Memorabilia |Movie Memorabilia
RIS    41520    439     1      "james bond"    \
       + Entertainment |DVDs & Movies |DVD |Action & Adventure
RIS    31686    2894    2                      \
       − Sports |Sporting Goods |Airsoft |Airsoft Guns |Spring
RIS    219      381     1      "james bond"    \
       − Collectibles |Trading Cards |Other Non-Sports
```

The text output may be reformatted to fit a page, and a "\" (backslash) may indicate that a following line is part of the line in which the backslash appears.

In the given example, the first part of the response is a set of headers respectively: Tq is the CPU time it took to compute the suggestions, Q is the quality of the suggestion, Nd is the estimated number of items the original query (jame bond dvd) would have returned, and Nr is the requested number of suggestions and RIS identifies Recommendations In Search.

The second part of the response may be the actual suggestions. Each suggestion may comprise 6 tab-delimited fields, in the following exemplary order:

Field 1: The class of suggestion,

Field 2: The category id of the category RIS suggests to run the query in,

Field 3: The estimated number of items yielded by this suggestion,

Field 4: The number of spell checked mistakes,

Field 5: The rewritten query text,

Field 6: The full path of the category.

In this example, the first suggestion is to search for the phrase "james bond" in Movie Memorabilia (exemplary category id 196). Depending upon the specific embodiment, running this exemplary query may yield about 756 items and spell checked one typo (it added an "s" to "jame"). The third suggestion provided by the search intelligence module 502 is to browse the category "Airsoft Guns, Spring", this suggestion spell checked two typos (removing the two words of the query).

In another exemplary embodiment, the search intelligence module provides a keywords service, which returns a list of all tokens or terms that occur within the item titles. A token consists either of a single word (e.g. "car"), or a phrase (e.g. "louis vuitton"). For each keyword it returns, the service may provide the following information:

The text of the keyword,

An optional spell checked version of the keyword,

The number of occurrences of the keyword in item titles,

A recommended category for the keyword, which may be used to construct a landing page URL, The estimated number of items whose title include this keyword in the recommended category, and A measure of the spread of the keyword across all the categories. This measure may be a positive real number; a value of zero may indicate the keyword is very specific to the category, higher values may indicate the keyword is not specific to the category.

In addition to these keywords, the keywords service may return general information such as the total number of keywords returned and the amount of CPU consumed computing the list.

For example, assume all keywords for the root category are required, invoking the following URL may launch a keywords service:

http://atg-dev2:8013/keywords?Mi=5&Si=0 wherein, the Mi (min occurs) parameters specifies that a user wants only the keywords that occurred at least five times in item titles; and Si specifies the user is interested in site 0. The response of the service may be a plain text, utf-8 encoded file that has two parts. The first part may include general response information and the second part may include the actual keyword data. Exemplary headers and keyword data are described in the table below:

TABLE 1

Headers

| Name | Description | Availability (embodiment dependent) |
|---|---|---|
| Nd | Total number of items in requested category. | Optional |

TABLE 1-continued

Headers

| Name | Description | Availability (embodiment dependent) |
|---|---|---|
| Tq | CPU time consumed computing the list of keywords | Always |
| Nr | Number of keywords returned | Always Indicates the end of headers. |

TABLE 2

Keyword data

| Field No | Description |
|---|---|
| 1 | Keyword text<br>The actual text of the keyword, which consists of one or more spaced separated word(s). In one embodiment this field may never be empty. |
| 2 | Spell-checked keyword text<br>If the keyword has a matching spell-checked version, this field may carry its text. This field may be empty if the keyword has no spell-checked version. |
| 3 | Count in category<br>The number of times this keyword occurred in the item titles of the requested category. This field may always be present, and have a integer value. |
| 4 | Best Category<br>The category that will yield the most items for this keyword. This category may be constrained to be of a certain level using the Cl input parameter. All keywords may be assigned a category, independently of their noise level (see below). |
| 5 | Estimated item count in best category<br>Estimated number of items containing this keyword in the best category. This field may always be present, and have a real number value. |
| 6 | Keyword noise level<br>A measure of how specific the keyword is to the best category. A keyword that only occurs in a single category may get a spread negative or close to 0, whereas a keyword that occurs in a lot of categories may have a high positive (unbounded) value. This field may always be present, and have a real number value. |

Spell Check Service Adaptor

In an exemplary embodiment of the present invention, a spell check service adaptor 504 may be provided that retrieves and aggregates the spell check suggestions. The adaptor 504 may then transform the suggestions into a form that is used by the front end. Basically, the adaptor 504 may communicate with the search intelligence module 502 using HTTP to obtain spell check recommendations. In one embodiment, to simplify the implementation on both sides, there may be one request to the search intelligence module per field check. However, it will be appreciated that the adaptor 504 may be configured or designed to make multiple request to enhance the efficiency of a system (e.g., the system 10).

Figure 13:
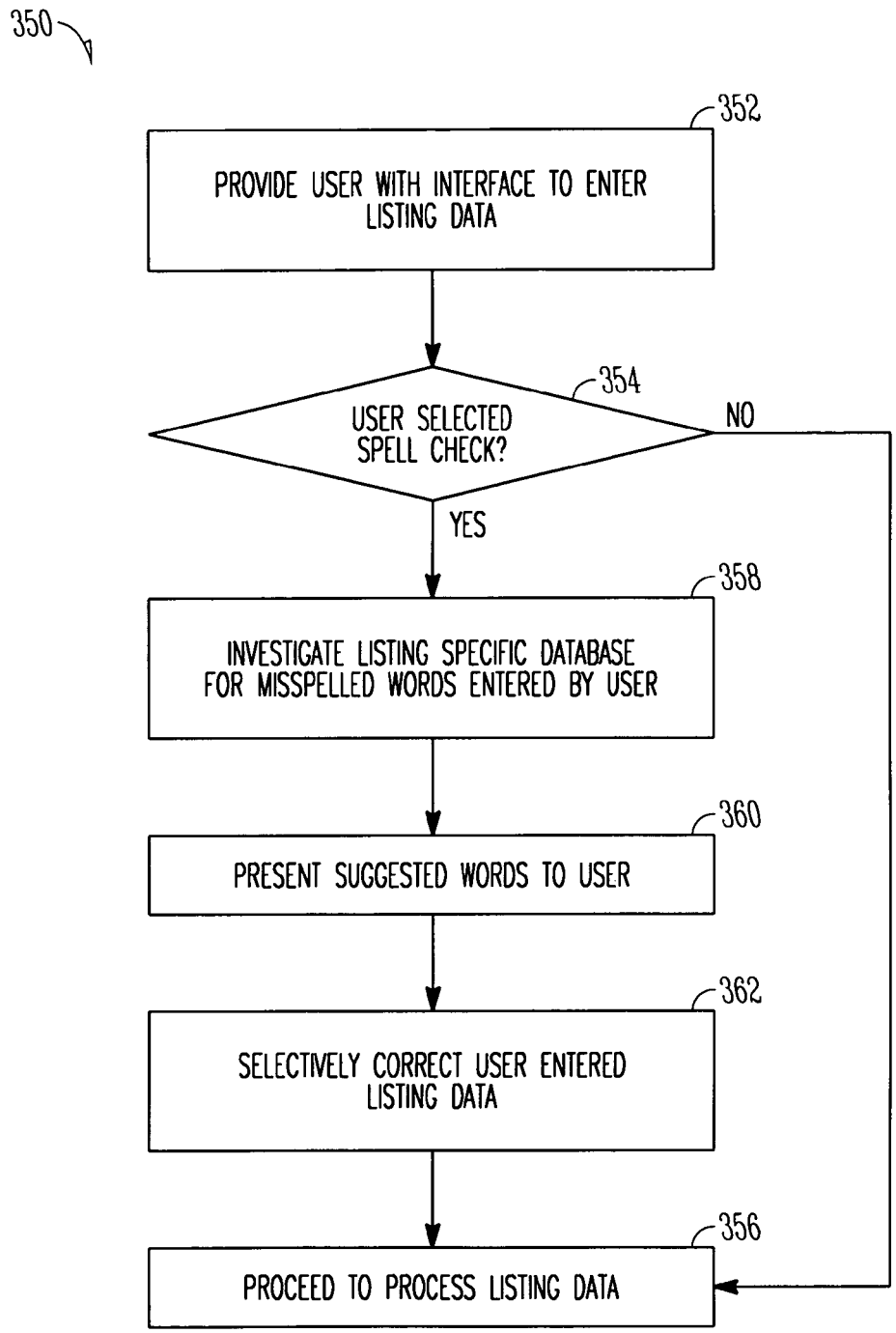
FIG. 13 is an exemplary block diagram of a method, in accordance with the invention, for processing listing data in a network-based commerce system.

Thus a method and system to process listing data has been described. As can been seen in FIG. 13, in one embodiment an exemplary method 350 broadly provides a user with an interface to enter listing data using operation 352—and checks if the user has selected an spell check option using operation 354. If not, the method 350 proceeds to process the listing data as shown at operation 356. However, if the user opts to conduct a spell check, then the method 350 investigates a listing specific database for misspelled words that may have been entered by the user, via operation 358, and presents suggested words to the user at operation 360, as described by way of example in detail above. Thereafter the method 350 selectively corrects the user entered listing data using operation 362 and proceeds to operation 356 to process the listing data.

From the foregoing it will be appreciated that, although specific embodiments of the invention have been described herein for purposes of illustration, various modifications may be made without deviating from the spirit and scope of the invention. In particular, the separate blocks of the various block diagrams represent functional blocks of methods or apparatuses and are not necessarily indicative of physical or logical separations or of an order of operation inherent in the spirit and scope of the present invention. The present specification and figures are accordingly to be regarded as illustrative rather than restrictive.

What is claimed is:

1. A method of processing listing data in a network-based publication system, the method comprising:

storing, by at least one hardware computer processor and storage, in a database, a list of reference words that relate to listings provided by the network-based publication system, the reference words being words that are frequently spelled incorrectly;

providing a user with a graphic user interface to enter a query comprising listing data in the network-based publication system, the listing data including at least one entered word operated on by a spellchecker engine having the at least one word as an input and a corrected spelling as an output;

providing a rule to define certain types of listing data;

identifying listing data that meets the rule;

based on the identified listing data, overriding the spellchecker engine output and producing a set of suggestions of preferred words for the identified listing data irrespective of any spelling of the identified listing data;

based on the at least one entered word, other than the identified listing data, being misspelled, querying the database and identifying a plurality of suggested words that are correctly spelled from the list of reference words that are frequently misspelled to replace the at least one entered misspelled word;

and
communicating the plurality of suggested words to the user.

2. The method of claim 1, wherein the reference words are words that are search terms frequently entered by users of the network-based publication system.

3. The method of claim 1, further comprising:
determining if the frequency of each of the plurality of suggested words meets a threshold; and
communicating the suggested words that meet the threshold to the user.

4. The method of claim 1, wherein the reference words are provided in a specific dictionary that includes words associated with listings in a plurality of categories, and in a language dictionary including words of a selected language.

5. The method of claim 1, wherein the reference words are context dependent and associated with one of a title, a description, and a condition of sale of a listing in the network-based publication system.

6. The method of claim 1, wherein the entered word is one of a word entered to perform a search query, a word entered to create a new listing, and a word entered while editing a listing.

7. A system to process listing data in a network-based publication system, the system comprising:
one or more computer hardware processors configured to
provide a user with a graphic user interface to enter a query comprising listing data in the network-based publication system, the listing data including at least one entered word operated on by a spellchecker engine having the at least one word as an input and a corrected spelling as an output;
provide a rule to define certain types of listing data;
identify listing data that meets the rule;
based on the identified listing data, override the spellchecker engine output and produce a set of suggestions of preferred words irrespective of any spelling of the identified predefined listing data;
store in a database a list of reference words that relate to listings provided by the network-based publication system and that are words that are frequently spelled incorrectly;
based on at least one entered word, other than the identified listing data, being misspelled, query the database and identify a plurality of correctly spelled suggested words from the list of reference words that are frequently misspelled to replace the at least one entered misspelled word, the plurality of suggested words to be communicated to the user.

8. The system of claim 7, wherein the reference words are words that are search terms frequently entered by users of the network-based publication system.

9. The system of claim 7, further to make a determination if a frequency of the plurality of suggested words meet a threshold and the plurality of suggested words is to be presented to a user when the threshold is met.

10. The system of claim 7, wherein the reference words are provided in a specific dictionary that includes words associated with listings in a plurality of categories, and in a language dictionary including words of a selected language.

11. The system of claim 7, wherein the reference words are context dependent and associated with one of a title, a description, and a condition of sale of a listing in the network-based publication system.

12. The system of claim 7, wherein the entered word is one of a word entered to perform a search query, a word entered to create a new listing, and a word entered while editing a listing and the search query is rewritten to include at least one of the suggested words when the entered word is misspelled.

13. At least one computer processor and storage configured to execute a data processing module for processing listing data in a network-based publication system, the module comprising:
means for storing a list of reference words that relate to listings provided by the network-based publication system and that are words that are frequently spelled incorrectly;
means, for providing a user with a graphic user interface to enter listing data in the network-based publication system, the listing data including at least one entered word that is operated on by a spellchecker engine having the at least one word as an input and a corrected spelling as an output;
means for providing a rule to define certain types of listing data;
means for identifying listing data that meets the rule;
means, based on the identified listing data, for overriding the spellchecker engine output and producing a set of suggestions for the identified listing data irrespective of any spelling of the identified listing data;
means for querying the database based, on the at least one entered word other than the identified listing data;
means for identifying a plurality of correctly spelled suggested words from the list of reference words based on at least one entered word, other than the identified listing data, being misspelled;
and
means for communicating the plurality of correctly spelled suggested words to the user.

14. A method of processing listing, data in a network-based publication system, the method comprising:
storing, by one or more hardware computer processors, in a database, a list of reference words that relate to listings provided by the network-based publication system, the reference words being words that are frequently spelled incorrectly;
providing a user with a graphic user interface to enter listing data in the network-based publication system, the listing data including at least one entered word operated on by a spellchecker engine having, the at least one word as an input and a corrected spelling as an output;
providing a rule to define certain types of listing data;
identifying listing data that meets the rule;
based on the identified listing data, overriding the spellchecker engine output and producing and communicating a set of suggestions of preferred words for the identified listing data irrespective of any output from the spellchecker engine;
based on the at least one entered word, other than the identified listing data, being misspelled, querying the database and identifying a plurality of suggested words that are correctly spelled from the list of reference words that are frequently misspelled to replace the at least one entered misspelled word;
ranking the plurality of suggested words based on a frequency that each particular word is entered as a search term in the networked-based publication system; and
communicating the plurality of suggested words to the user based upon their ranking.

* * * * *